United States Patent

Lambiris

[15] 3,695,215
[45] Oct. 3, 1972

[54] TRANSMISSION GEARSHIFT INDICATOR

[72] Inventor: Theodore Lambiris, Walled Lake, Mich.

[73] Assignee: General Motors Corporation, Detroit, Mich.

[22] Filed: Oct. 29, 1971

[21] Appl. No.: 193,804

[52] U.S. Cl..............116/124 R, 74/89.2, 74/89.22, 116/135, 324/145
[51] Int. Cl................................................G09f 9/00
[58] Field of Search.....116/70, 124, 124.1, 114, 129, 116/129 R, 129 A–129 T, 117, 135, DIG. 6, DIG. 23, DIG. 20; 73/141 AB; 58/126 B; 324/114, 115, 156, 157, 158, 145; 74/10.7, 475, 473, 487, 506, 501, 501.5, 552, 484, 493, 89.2, 89.22

[56] References Cited

UNITED STATES PATENTS

| | | |
|---|---|---|
| 287,841 | 11/1883 | McCloskey.............73/141 AB |
| 1,594,536 | 8/1926 | Ludlow..................116/129 R |
| 2,764,894 | 10/1956 | Faxen......................116/70 X |
| 2,925,061 | 2/1960 | Thornburgh et al. ...116/124 R |
| 3,088,449 | 5/1963 | Hockaday et al.....74/89.22 X |

FOREIGN PATENTS OR APPLICATIONS 1,216,841   11/1959   France...................116/136.5

*Primary Examiner*—Louis J. Capozi
*Attorney*—W. E. Finken et al.

[57] ABSTRACT

In a preferred form, this disclosure relates to an indicator mechanism for a transmission control system. The indicator mechanism comprises a housing means which has a dial associated therewith with spaced representations corresponding to different transmission settings, a pulley which is supported by the housing means for movement in opposite directions adjacent the dial, spring means which biases the pulley toward one end of the dial, a pointer which is adapted to move in opposite directions with the pulley to positions adjacent different ones of the representations to provide a visual indication of the transmission settings, and a cable which extends around the pulley and which acts in opposition to the spring means. The cable is adapted to be connected to a rotatable gearshifting member. The pulley rotates and moves in opposite directions adjacent the dial in response to movement of the gearshifting member to effect different transmission settings whereby the pointer is moved across the dial distances less than those traveled by the cable.

4 Claims, 3 Drawing Figures

PATENTED OCT 3 1972    3,695,215

INVENTOR.
Theodore Lambiris
BY
W.A. Schuetz
ATTORNEY

TRANSMISSION GEARSHIFT INDICATOR

The present invention relates to a transmission gearshift indicator, and more particularly to a transmission gearshift indicator which has a pointer which travels across a dial to provide a visual indication of the transmission setting.

Transmission gearshift indicators have heretofore been provided which are mounted upon the instrument panel of an automotive vehicle and within a cluster of gauges and other indicating devices; such as those indicating coolant temperature, fuel supply, oil pressure, etc; for visual inspection by the operator of the vehicle. Transmission gearshift indicators have also been provided which comprise a lever with a pointer member which is spring biased in one direction along a dial and wherein the movement of the pointer along the dial is substantially equal to the movement of a cable actuator which is connected to the transmission shift tube. For example, see U.S. Pat. No. 2,925,061. Because of the variety and number of different gauges and indicating devices which are mounted upon the vehicle instrument panel, it is desirable that each gauge and indicating device be as compact as possible in order that the resulting instrument cluster be of an overall size conducive to easy visual inspection by the driver of the vehicle.

Problems can occur, however, in attempting to provide a compact gearshift indicator of the variety described above because the size of the dial of such an indicator is a function of the travel of the transmission shift tube between its different transmission settings. With this in mind, the present invention provides a novel transmission gearshift indicator having a pointer which moves a distance across a dial to indicate the different transmission settings which is less than the distance moved by a cable actuator so that the dial can be of a compact size.

An object of the present invention is to provide a new and improved transmission gearshift indicator for use in a transmission control system and which includes a housing means which has a dial associated therewith with spaced representations corresponding to different transmission settings, a pulley which is supported by the housing means for movement in opposite directions adjacent the dial, a spring means which biases the pulley toward one end of the dial, a pointer which is adapted to move with the pulley, to positions adjacent different ones of the representations to provide a visual indication of the transmission settings, a cable which extends around the pulley to act in opposition to the spring means, and wherein the cable is adapted to be connected to a rotatable gearshifting member for movement in response to rotation thereof, and the pulley is rotated and moves in opposite directions adjacent the dial in response to movement of the gearshifting member to different transmission settings whereby the pointer is moved across the dial distances less than those traveled by the cable.

Another object of the present invention is to provide a new and improved gearshift indicator as defined in the preceding object, and wherein the spring means and pointer are integral.

These and other objects of the present invention are accomplished in the preferred embodiment by providing a transmission gearshift indicator mechanism for use with a transmission control system having a transmission gearshift assembly movable in opposite directions between different positions to control the transmission settings. The indicator comprises a housing means which includes a rectilinear guide track and a dial with spaced representations along its length which correspond to the different transmission settings, a pulley which is supported within the housing means for rotation and rectilinear movement adjacent the dial, a spring means which has one end connected to the pulley and its other end affixed to the housing means and which biases the pulley toward one end of the dial, the spring means having a pointer which is integral with the spring means and which is adapted for rectilinear movement with the pulley along the length of the dial, and a cable which extends around the pulley and which acts in opposition to the spring means, and with the cable having one end fixed to the housing means and its other end operatively connected with the gearshift assembly to travel therewith in response to movement of the gearshift assembly. When the gearshift assembly is moved in one direction the pulley is moved against the bias of the spring means in one direction adjacent the dial and when moved in the opposite direction the pulley is moved by the bias of the spring means in the opposite direction adjacent the dial. The pointer is moved across the dial a distance which is one half the distance the cable moves because the cable extends around the pulley whereby the indicator dial is of a very compact size.

These and other objects of the invention will become more fully apparent from the following detailed description and drawings wherein.

Figure 1:
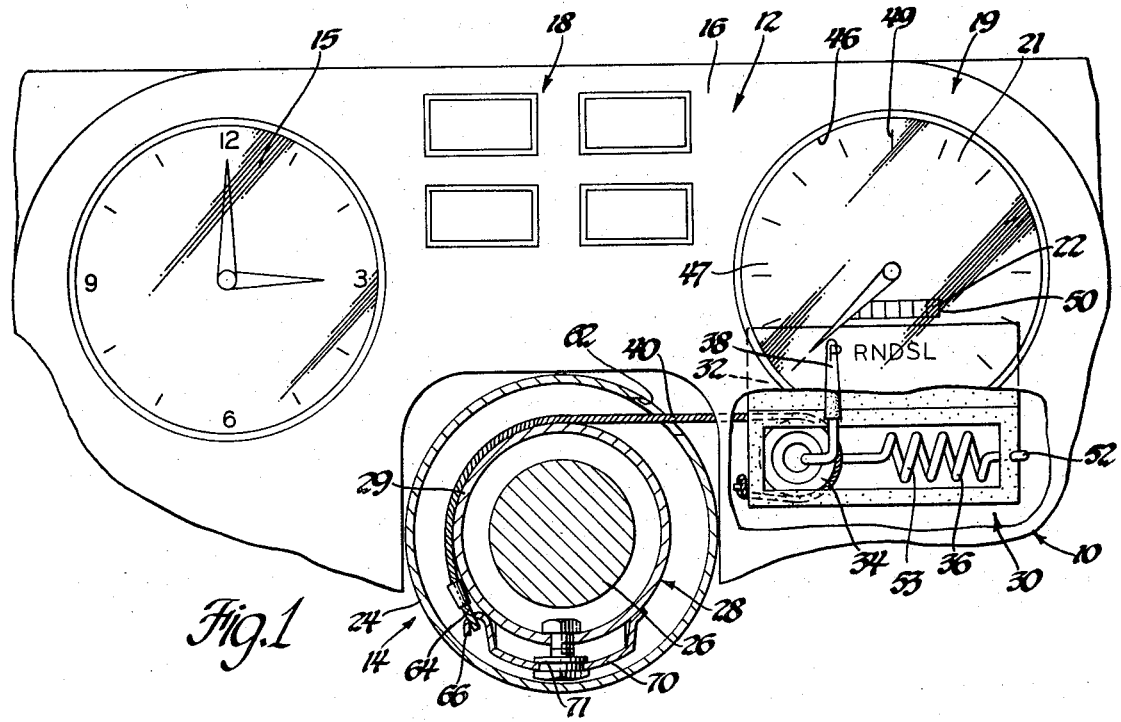
FIG. 1 is a fragmentary front elevational view with portions removed and shown in section of an automotive vehicle instrument panel and steering column embodying the transmission gearshift indicator of the present invention.

As representing the preferred embodiment of the present invention, the drawings show a transmission gearshift indicator 10 included with an instrument cluster upon an instrument panel 12 of an automotive vehicle (not shown). The instrument cluster 12 is located at a location immediately adjacent a conventional steering column 14.

The instrument panel 12 is shown as including a decorative escutcheon or panel 16 which is positioned immediately adjacent and above the steering column 14 and which includes a clock or tachometer 15 and first and second clusters of gauges and indicating devices 18 and 19 suitably attached thereto. The first cluster of gauges and indicating devices 18 could include such gauges as those indicating the status of the water temperature, oil pressure, fuel supply, emergency brake, etc. The second instrument cluster 19 is also suitably attached to the escutcheon panel 16 of the instrument panel 12. The second cluster 19 includes a suitable speedometer 21, a suitable odometer 22, and the transmission gearshift indicator 10 of the present invention.

Referring to FIG. 1, the steering column 14 of the vehicle is conventional and includes an outer mast jacket 24 which is supported upon a bracket member (not shown) which is in turn attached to the vehicle body structure adjacent the underside of the instrument panel 12. The steering column 14 also includes a steering shaft 26 which is supported in a concentric manner within the mast jacket 24 and which extends from its upper end (not shown) which is attached to a vehicle steering wheel (not shown) to its lower end (not shown) which is received within a steering gear housing (not shown). The steering column 14 further includes a shift tube assembly 28 including a shift tube 29 which is supported in a concentric manner between the mast jacket 24 and the steering shaft 26. The shift tube assembly 28 has a conventional, manually manipulatable gearshift lever (not shown) connected to the shift tube 29 adjacent its upper end and has its lower end mounted in an adapter and operatively connected by a suitable linkage to the vehicle transmission (not shown). The shift tube assembly 28 is rotated by manual manipulation of the gearshift lever between its various settings and, through the aforementioned adapter and linkage, serves to change the setting of the transmission.

The transmission gearshift indicator 10 of the present invention broadly comprises a housing means 30 with a dial 32 associated therewith, a pulley 34 which is supported by the housing means 30 for movement adjacent the dial 32, a spring means 36 which biases the pulley 34 in one direction within the housing means 30, a pointer 38 which is adapted to move with the pulley 34, and a cable 40 connected with the shift tube 29 and reversely looped around the pulley 34 to act in opposition to the bias of the spring means 36.

Figure 2:
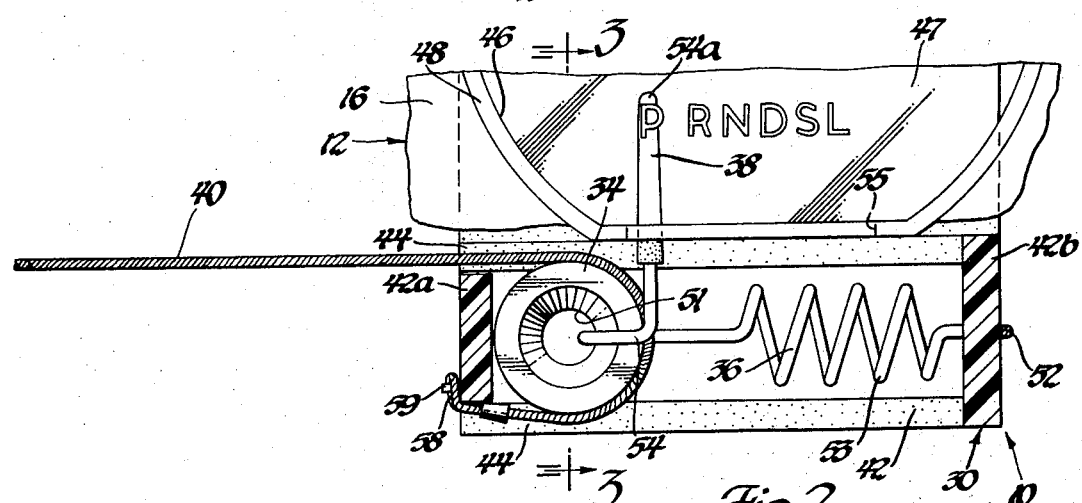
FIG. 2 is an enlarged fragmentary front elevational view of the transmission gearshift indicator of the present invention.
Figure 3:
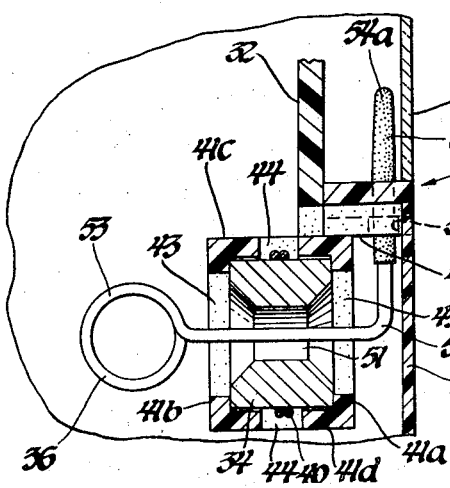
FIG. 3 is a sectional view of the transmission gearshift indicator of the present invention and taken along line 3—3 of FIG. 2.

The housing means 30 is mounted in any suitable manner behind the escutcheon panel 16 and at a position immediately below the dial 32 and adjacent the steering column 14. Referring to FIGS. 2 and 3, the housing means 30 is shown as a hollow member having a generally rectangular cross-section and has front, back, top and bottom sides 41a–d and end members 42a–b. The front and back sides 41a–b have centrally located, relatively wide rectangular slots 43 therethrough and the top and bottom sides 41c–d have centrally located, relatively narrow slots 44 therethrough which extend through the upper and lower portions of the end member 42a, as shown in FIG. 2. The pulley 34 is positioned within the housing means 30 with the bottom side 41d supporting it. The top side 41c substantially prevents upward movement of the pulley 34. Further, the pulley is positioned between the front and back sides 41a–b which serve to prevent horizontal movement of the pulley 34 in all but two directions. From the above and with reference to FIGS. 2 and 3, it should be seen that the housing means 30 serves as a guide track for rectilinear movement of the pulley 34 immediately adjacent the dial 32.

The dial 32 of the second instrument cluster 20 is generally circular in shape and is mounted in any suitable manner behind a complementary shaped aperture 46 of the escutcheon panel 16. It should be noted that a transparent plastic window 47 is positioned within the aperture 46 and adjacent the escutcheon 16 to protect the second cluster 19. The aperture 46 of the escutcheon panel 16 is defined by a circular flange 48 which extends backwardly from the escutcheon panel 16, as shown in FIG. 3, and has the dial 32 in an abutting, fixed relationship therewith. In this respect, the dial 32 is recessed from the escutcheon 16. The dial 32 includes a graduated speedometer scale 49 which extends in an arcuate manner adjacent the periphery of the dial 32 for approximately 270°. The dial 32 also includes a rectangular aperture 50 immediately adjacent and below its central portion and behind which the vehicle's odometer 22 is positioned. At the lowermost portion of the dial 32 and between the two ends of the graduated speedometer scale 49, is a series of linearly, horizontally spaced representations which correspond to the different transmission settings. The spaced representations are herein shown as P for park, R for reverse, N for neutral, D for drive, S for second and L for low. It should be noted that the spaced representations are located immediately above the housing means 30, as shown in FIGS. 1 and 2.

The pulley 34 or roller is herein shown as being generally cylindrical with a central aperture 51 therethrough and is supported within the housing means 30, as was previously described, for horizontal, rectilinear movement therein and immediately below the spaced representations on the dial 32.

The spring 36, which could also be of any suitable variety, is herein shown as a coiled compression spring and serves to bias the pulley 34 toward the right hand end of the spaced representations of the dial 32 and the end member 42b of the housing means 30, as shown in FIG. 2. The spring 36 has one end 52 formed in a hooked or U-shaped manner and positioned about the central portion of the end member 42b of the housing means 30, as shown in FIGS. 1 and 2. The spring means 36 includes a central portion 53 consisting of a series of helical coils, as shown in FIG. 2, and which extends outside the housing means 30 adjacent the back side 41b, as shown in FIG. 3. The other end portion 54 of the spring means 36 is also hooked or U-shaped and has the bight portion thereof extending through the central aperture 51 of the pulley 34. Further, the end 54 of the spring means 36 terminates in an upwardly extending portion which can itself serve as the pointer 38 or which can be used to mount a complementary shaped sleeve 54a should a larger or more distinct pointer 38 be desired. The pointer 38 extends through a narrow rectangular slot 55 in the lowermost portion of the flange 48 of the escutcheon panel 16 and projects to a position immediately adjacent the spaced representations upon the dial 32.

The cable 40 is reversely looped about the pulley 34 to act in opposition to the bias of the spring means 36 and serves to control the positioning of the pulley 34 within the housing means 30 and the positioning of the pointer 38 adjacent different ones of the spaced representations in response to rotation of the shift tube assembly 28. The cable 40 is herein shown as a double stranded cable having one end 58 formed in a single loop and received upon a pin extension 59 projecting outwardly from the end member 42a of the housing means 30. In this manner, the one end 58 of the cable 40 is fixed to the housing means 30. From its fixed one end 58, the cable extends rightwardly within the slot 44 in the bottom side 41d and is wrapped about the pulley 34 for approximately 180°, as shown in FIG. 2. The cable 40 then extends leftwardly for a distance within the slot 44 in the top side 41c and, thereafter extends outwardly of the housing means 30 and through an opening 62 in the mast jacket 24 of the steering column 14. It should be noted that the portions of the top and bottom sides 41c–d defining the slots 44 prevent any possibility of the cable 40 sliding laterally off the pulley 34. The cable 40 is wrapped around the outer periphery of the shift tube assembly 28, as shown in FIG. 1. The other end 64 of the cable 40 is also formed in a loop which forms a quick detachable connection with a hook 66 on an adjusting clip 70 which is secured to the outer periphery of the shift tube assembly 28 by a bolt 71.

In operation and assuming the transmission gearshift indicator 10 to be in its park position, as shown in FIG. 1, rotation of the shift tube assembly 28 in a clockwise direction tends to slacken the upper run of the cable 40. The slackening of the cable 40 allows the spring 36, which keeps the cable 40 taut as a result of its biasing force, to move the upper run of the cable 40 and the pulley 34 toward the right. Since the cable 40 at the end 58 of its lower run is anchored to the housing 30, movement of the pulley 34 toward the right by the spring 36 also causes the pulley 34 to roll in a clockwise direction on the bottom of the housing and the upper run of the cable 40 to be wrapped therearound. As well, this wrapping of the cable 40 around the pulley 34 reduces the linear rightward movement of the pulley such that the pulley is linearly moved a distance which is one half the linear distance that the upper run of the cable 40 is moved.

In this respect, the pointer 38, which is affixed to the spring 36 to move rectilinearly with the pulley 34, is moved rightwardly along the spaced representations on the dial 32 and a distance equal to one half the distance moved by the cable 40. Further, counterclockwise rotation of the shift tube assembly 28 moves the other end 64 of the cable 40 to cause rotation and movement of the pulley 34 leftwardly within the housing means 30 against the bias of the spring 36. As previously described, the pointer 38 is thereby caused to move leftwardly in a rectilinear manner along the spaced representations on the dial 32 a distance equal to one half the distance moved by the cable 40. In this manner, the pointer 38 is moved across the dial 32 to positions adjacent different ones of the representations which correspond to different settings of the transmission to provide a visual indication of the transmission settings.

An important advantage of the gearshift indicator of the present invention is that the representations on the dial can be closely spaced, since the pointer 38 is only moved one half the linear distance the cable 40 is moved. This provides a dial which is small and compact.

The foregoing disclosure relates to only one embodiment of the invention which may be modified within the scope of the appended claims.

What is claimed is:

1. A transmission gearshift indicator for use with a transmission control system, comprising: a housing means having a dial associated therewith with spaced representations corresponding to different transmission settings; a pulley supported by said housing means for movement in opposite directions adjacent said dial; spring means for biasing said pulley toward one end of said dial; a pointer adapted to move in opposite directions with said pulley to positions adjacent different ones of said representations to provide a visual indication of the transmission settings; a cable extending around said pulley and acting in opposition to said spring means, said cable being adapted to be connected to a rotatable gearshifting member, said pulley being rotated and moved in opposite directions adjacent said dial in response to movement of the gearshifting member to effect different transmission settings whereby said pointer is moved distances across the dial less than those traveled by the cable.

2. An indicator mechanism for a transmission control system having a transmission gearshift assembly movable in opposite directions between different positions to effect different transmission settings, comprising: a housing means having a dial associated therewith with spaced representations along its length corresponding to different transmission settings; a pulley supported by said housing means for rolling rectilinear movement in opposite directions adjacent said dial; spring means having one end connected with said pulley and its other end connected to said housing means for biasing said pulley toward one end of said dial, said spring means having an integral pointer adapted to move in opposite directions with said pulley to positions adjacent different ones of said spaced representations to provide a visual indication of the transmission setting; and a cable extending around said pulley and acting in opposition to said spring means, said cable having one end fixed to said housing means, said cable having its other end operatively connected with the gearshift assembly to travel therewith in response to movement of the gearshift assembly in one direction to effect a different transmission setting for moving said pulley against the bias of said spring means in one direction adjacent said dial, when the gearshift assembly is moved in the opposite direction to effect a different transmission setting said pulley is moved by the bias of said spring means in the opposite direction adjacent said dial whereby said pointer is moved distances across said dial equal to one half those traveled by said cable.

3. An indicator mechanism in combination with a vehicle transmission control system having a transmission shift tube supported within a vehicle steering column and rotatable to effect different transmission settings in response to movement of a gearshift assembly, comprising: a housing means associated with an instrument panel of the vehicle for providing a rectilinear guide track and having a dial associated therewith with spaced representations extending from end to end corresponding to different transmission settings; a pulley supported within said housing means immediately adjacent and below said dial for rolling rectilinear movement in opposite directions along the length of said dial, said pulley having a central aperture therethrough substantially defining its axis; a coil spring having a U-shaped end received within said central aperture of said pulley and having its other end connected to one end of said housing means, said U-shaped end of said coil spring terminating in a pointer extending upwardly to a position adjacent the face of said dial and being adapted to move in opposite directions with said pulley to positions adjacent different ones of said spaced representations to provide a visual indication of the transmission setting; and a cable which extends intermediate its ends around said pulley and acts in opposition to said spring means, said cable having one end fixed to said housing means, said cable having its other end operatively connected with the transmission shift tube to travel therewith in response to movement of the transmission shift tube, said transmission shift tube when moved in one direction to effect a different transmission setting moving said pulley against the bias of said spring means in one direction adjacent said dial, said spring means when said transmission shift tube is moved in the opposite direction to effect a different transmission setting moving said pulley in the opposite direction adjacent said dial whereby said pointer is moved distances across said dial equal to one half the distances moved by said cable.

4. A transmission gearshift indicator for use with a transmission control system, comprising: a housing means having a dial associated therewith with spaced representations corresponding to different transmission settings; a movable member supported by the housing for movement in opposite directions adjacent the dial, a pointer means carried by said housing means for movement in opposite directions to positions adjacent different ones of said representations to provide a visual indication of the transmission settings; spring means for biasing said movable member and pointer means toward one end of said dial; a cable reversely looped about said movable member at a location spaced from its axis of movement to act in opposition to said spring means and having one end fixed, said cable being adapted to be connected to a rotatable gearshifting member, said movable member being moved in opposite directions adjacent said dial in response to movement of the gearshifting member to effect different transmission settings whereby said pointer is moved distances across the dial less than those travelled by the cable.

* * * * *